(12) United States Patent
Fritschi

(10) Patent No.: US 7,670,043 B2  
(45) Date of Patent: Mar. 2, 2010

(54) DEVICE HAVING A POLYSOMIC DRIVE BODY FOR GENERATING PULSED MOTIONS IN A GAS, LIQUID AND/OR BULK GOOD

(75) Inventor: Markus Fritschi, Itingen (CH)

(73) Assignee: Hortimax B.V., Pijnacker (NL)

( * ) Notice: Subject to any disclaimer, the term of this patent is extended or adjusted under 35 U.S.C. 154(b) by 1032 days.

(21) Appl. No.: 10/552,648

(22) PCT Filed: Apr. 10, 2003

(86) PCT No.: PCT/CH03/00235

§ 371 (c)(1),  
(2), (4) Date: Dec. 2, 2005

(87) PCT Pub. No.: WO2004/090383

PCT Pub. Date: Oct. 21, 2004

(65) Prior Publication Data

US 2006/0166612 A1    Jul. 27, 2006

(51) Int. Cl.  
*B01F 13/00* (2006.01)

(52) U.S. Cl. ..................... 366/219

(58) Field of Classification Search .......... 366/53, 366/55, 62, 63, 208, 211, 219, 233, 241, 366/342, 343; 74/60; 451/326–330  
See application file for complete search history.

(56) References Cited

U.S. PATENT DOCUMENTS 2,302,804 A * 11/1942 Schatz .................. 366/209  
2,991,657 A * 7/1961 Schatz ................... 74/1 R (Continued)

FOREIGN PATENT DOCUMENTS

CH            242218      * 9/1946

(Continued)

OTHER PUBLICATIONS

Machine translation of descrption in WO 99/05435 dated Feb. 1999.*

(Continued)

*Primary Examiner*—Charles E Cooley  
(74) *Attorney, Agent, or Firm*—Rankin, Hill & Clark LLP (57) ABSTRACT

A device generating pulsed motions comprises: (A) two parallel shafts (3; 4) each having a longitudinal axis (5; 6), a rear end (7; 8) and a front end (9; 10), (B) a gear unit (2) comprising at least two gears (20; 21) where at least two gears (20) are oval gears and each gear (20; 21) is connected to a rear end (7; 8) of the two shafts (3; 4), (C) two arcuate drive levers (30; 31) each having a first end (32; 33) and at least one second end (34; 35), where each first end (32; 33) of the drive levers (30; 31) is connected to one front end (9; 10) of the two shafts (3; 4) in rotatable manner about a first axis of rotation (11; 12), and (E) a drive body (40) which is connected to the second ends (34; 35) of the drive levers (30; 31) in rotatable manner about two second axes of rotation (13; 14), where (F) the drive body (40) is a polysomic body.

5 Claims, 8 Drawing Sheets

U.S. PATENT DOCUMENTS

| | | | | |
|---|---|---|---|---|
| 3,186,243 | A * | 6/1965 | Urban | 74/86 |
| 3,610,587 | A * | 10/1971 | Schatz | 366/209 |
| 3,824,866 | A * | 7/1974 | Schatz | 74/61 |
| 4,341,475 | A * | 7/1982 | Saladin | 366/211 |
| 4,669,225 | A * | 6/1987 | Kuster | 451/326 |
| 4,784,338 | A * | 11/1988 | Saladin | 241/101.2 |
| 5,238,304 | A * | 8/1993 | Zimmermann | 366/219 |
| 5,360,265 | A * | 11/1994 | Cruse | 366/208 |
| 5,466,124 | A * | 11/1995 | Dettwiler | 416/82 |
| 5,492,405 | A * | 2/1996 | Meyer | 366/208 |
| 5,492,406 | A * | 2/1996 | Meyer | 366/208 |
| 5,527,109 | A * | 6/1996 | Meyer | 366/208 |
| 6,435,995 | B1 * | 8/2002 | Salgo | 474/148 |
| 2006/0166612 | A1 * | 7/2006 | Fritschi | 451/326 |

FOREIGN PATENT DOCUMENTS

| | | | |
|---|---|---|---|
| CH | 500000 | * | 12/1970 |
| DE | 1207750 | * | 12/1965 |
| DE | 2842110 A | * | 4/1980 |
| JP | 11319879 A | * | 11/1999 |
| SU | 643305 | * | 1/1979 |
| SU | 730548 | * | 4/1980 |
| SU | 755577 | * | 8/1980 |
| SU | 762949 | * | 9/1980 |
| SU | 780871 | * | 11/1980 |
| SU | 795958 | * | 1/1981 |
| SU | 797878 | * | 1/1981 |
| SU | 818831 | * | 4/1981 |
| SU | 1607922 A1 | * | 11/1990 |
| WO | WO 9402235 A1 | * | 2/1994 |
| WO | WO 9402236 A1 | * | 2/1994 |
| WO | WO 9402237 A1 | * | 2/1994 |
| WO | WO 99/05435 | * | 2/1999 |

OTHER PUBLICATIONS

Machine translation of claims in WO 99/05435 dated Feb. 1999.*
Patent Abstracts of Japan, Waste Water Treatment and Waste Water Treatment Apparatus, Date of Publication: Nov. 24, 1999.
WO 99/05435, Gear With Oval Pinions, Date of Publication: Feb. 4, 1999.
Schatz, P., XP-002058827, Rhythmusforschung Und Technik, pp. 77-87, 1975.

* cited by examiner

DEVICE HAVING A POLYSOMIC DRIVE BODY FOR GENERATING PULSED MOTIONS IN A GAS, LIQUID AND/OR BULK GOOD

BACKGROUND OF INVENTION

1. Field of Invention

The present invention relates to a device having a polysomic drive body for generating pulsed motions in a gas, liquid and/or of a bulk good.

2. Description of Related Art

The patent document WO 99/05435 ABT discloses a gear unit transmitting torques in positive, i.e. geometrically locking manner between two shafts which are connected to the ends of a chain of at least two displaceable connecting links, where this chain is based on the principle of the everted, hereafter invertable links cube (Paul Schatz, "Rhythmusforschung und Technik", ["Rhythm Research and Engineering"] Freies Geistesleben Publisher, 1975/98, $2^{nd}$ edition}. In one embodiment mode the two connecting links are circular panes or tori allowing converting the kinetic energy of a flow of gas, of liquid or of another viscous medium, into a torque applied to two shafts rotating in pulsed manner. Inversely, a torque applied to at least one rotating shaft may be converted also into a pulsed flow motion of a gas, of a liquid or another viscous medium, however the relative motion of the two circular panes do generate high power dissipation and thereby entail low efficiency.

SUMMARY OF THE INVENTION

The objective of the present invention is to offer palliation. Its goal is to create a device generating pulsed motions and comprising a drive body of maximum efficiency.

The present invention solves this problem by a pulsed motion generator comprising two parallel shafts each having a longitudinal axis each having a rear end and each having a front end, a gear unit comprising at least two gears being oval gears and each gear being connected to one of the rear ends of the two shafts, two arcuate drive levers each having a first end and each having at least one second end, where each first end of the drive levers are connected in rotatable manner with one respective front end of the two shafts about a first axis of rotation, and a drive body connected to the second ends of the drive levers so as to be rotatable about two second axes of rotation, characterized in that the drive body is a polysomic body.

The advantages attained by the present invention substantially are as follows:
 a flow of a gas, of a liquid and/or of a bulk good can be attained with maximum drive body efficiency, and extensive flow within a large volume of the gas, of the liquid and/or of the bulk good is attainable, or
 inversely, the kinetic energy of a flowing gas, or a flowing liquid and/or a flowing bulk good is convertible at maximum efficiency into the rotation of at least one shaft.

Accordingly the drive body may be used on one hand to generate a pulsed flow of a gas, of a liquid and/or of a bulk good using motor drives while on the other hand it may be used to generate a shaft rotation by means of the kinetic energy in the flow of a gas, of a liquid and/or of a bulk good. In the latter application, a generator may be connected by a gear unit of oval gears to the minimum of one shaft rotating in pulsed manner.

In a preferred embodiment mode of the present invention, the drive body is an oloid in the form of a special polysome design. The mathematical definition of the oloid is given in the work "Rhythmusforschung und Technik:" [Rhythm Research and Engineering], Paul Schatz, Freies Geistesleben Publisher, 1998, $2^{nd}$ edition.

The oloid offers the advantages of low impedance, for instance when being used as an agitator/stirrer. As shown by the inversion kinematics discovered by Paul Schatz, the oloid moves like a paddle or like a fish tail fin in the medium to be agitated and as a result generates a rhythmically pulsed flow.

In a further embodiment mode, the legs of each arcuate drive lever will subtend a plane. Each first axis of rotation is transverse to the plane which is subtended by the legs of the corresponding drive lever and which contains that drive lever that is connected to said axis of rotation, whereas the two second axes of rotation are situated in these planes. The two second axes of rotation are mutually skewed. This drive lever design offers the advantage that the drive body may be used as the middle link of an articulation based on the principle of inverted articulations, namely that the gas, the liquid or the bulk good shall be moved in rhythmic pulses. The inverted articulation principle is one of the illustrative embodiments of the Paul Schatz inverse kinematics and is comprehensively discussed in "Rhythmusforschung und Technik", Freies Geistesleben Publisher, 1975/98, $2^{nd}$ edition.

In a further embodiment mode of the present invention, the two axes of rotation are apart a distance A.

In another embodiment mode, a gap B keeps the first axis of rotation apart from the second axis of rotation at every drive lever. Preferably the spacings A and B meet the condition A=B.

Each oval gear comprises a large semi-axis a and an small semi-axis b. The oval shape of these gears then is determined by the fact that two mutually meshing gears will roll on each other in positively locking manner at constant axial separation. The axial gap between two mutually meshing oval gears is composed of the sum of the large semi-axis a and the small semi-axis b of these two oval gears.

In another embodiment mode at least one oval gear exhibits a ratio of $1/\sqrt{2}$ of its small semi-axis b to its large semi-axis a.

In still another embodiment mode, at least one oval gear exhibits a ratio of 1/2 of its small semi-axis b to its large semi-axis a.

The two ratios of $1/\sqrt{2}$ and 1/2 of the small semi-axis b to the large semi-axis a are appropriate to convert uniform rotational motion for instance of a drive shaft into an irregular rotational motion of the two shafts acting on the drive lever, where said shafts run in rotationally pulsed manner according to the principle of invertible articulations.

BRIEF DESCRIPTION OF THE DRAWINGS

The invention and its further developments are elucidated below as several illustrative embodiments, which are partly shown in schematic views.

DETAILED DESCRIPTION OF THE INVENTION

Figure 1:
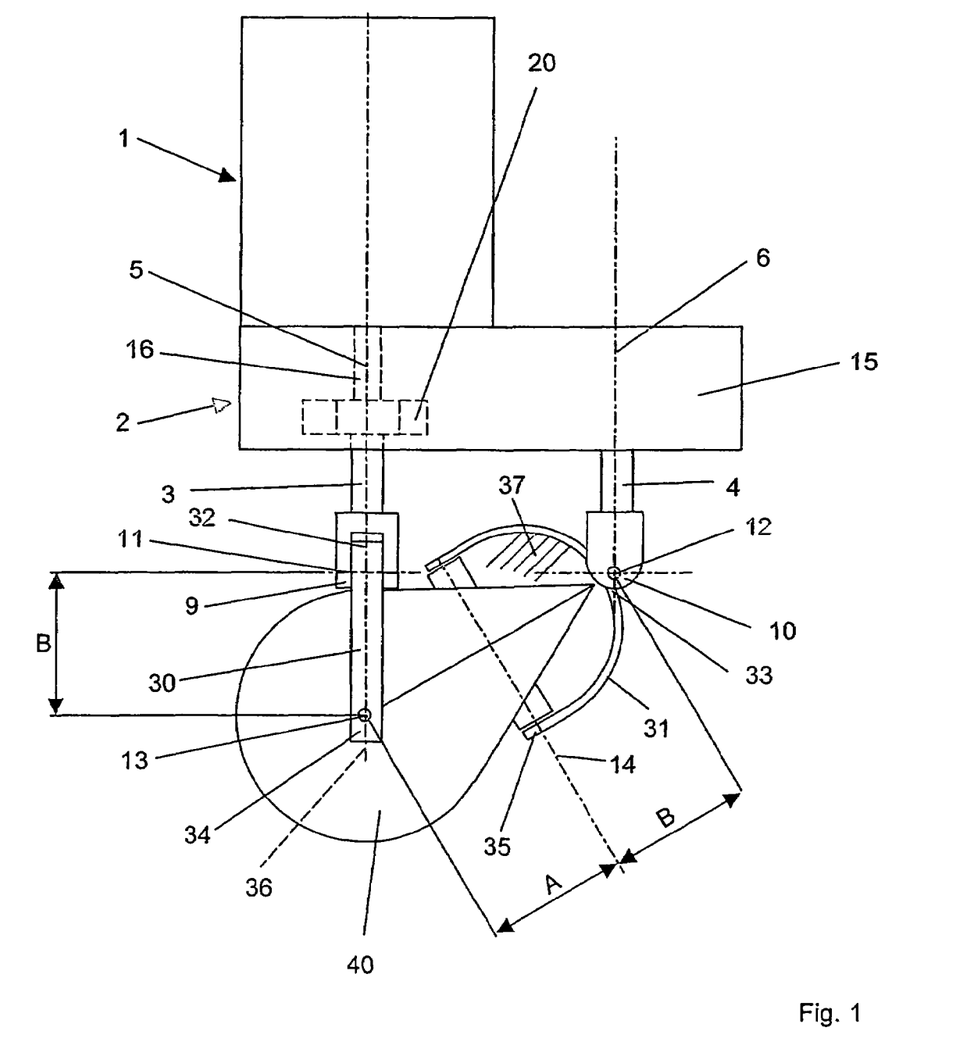
FIG. 1 is an elevation of one embodiment of the device of the present invention.

FIG. 1 shows an embodiment of the device of the invention used to generate a flow motion of the fluid enclosing the drive body 40. The drive body 40 is designed as an oloid and it is configured in a manner that its central part constitutes the middle link of an invertible articulation consisting of three links. The two outer links are U-shaped drive levers 30; 31 each fitted at their legs with two front, free ends 34; 35 and at their connection brackets each with one rear end 32; 33. Each of the rear ends 32; 33 of the two drive levers 30; 31 are displaceably related, hereafter connected, by means of a first axis of rotation 11; 12 to a front end 9; 10 of two parallel shafts 3; 4. The two first axes of rotation 11; 12 are connected in such manner to the drive levers 30; 31 that the first axis of rotation 11 connected to the drive lever 30 is perpendicular to a plane 36; 37 subtended by the legs and the connecting bracket of the drive lever 30 and in that the first axis of rotation 12 connected to the second drive lever 31 is perpendicular to a plane 37 subtended by the legs and the connecting bracket of the second drive lever 31. A gap B separates the first and second axis of rotation 11; 12; 13; 14 at each drive lever 30; 31.

The drive body 40 is displaceably connected to the drive levers 30, 31 by means of two second axes of rotation 13; 14 rotatably configured on the front ends 34; 35 of the drive levers 30; 31. The two second axes of rotation 13; 14 are configured obliquely to each other and apart by a distance A. That distance A in this case corresponds to the gap B.

The gap between the two parallel shafts 3; 4 follows from the constraint that the drive levers 30; 31 and the middle part between the two axes of rotation 13; 14 of the drive body 40 designed as an oloid shall constitute the three links of an invertible articulation. The (omitted) rear ends of the two parallel shafts 3; 4 are supported in rotatable manner about their longitudinal axes 5; 6. In the embodiment shown herein, only the first shaft 3 in a gear unit housing 15 is connected by a gear unit 2 of oval gears 20 to the drive shaft 16 of the motorized drive element(s) 1.

Figure 2:
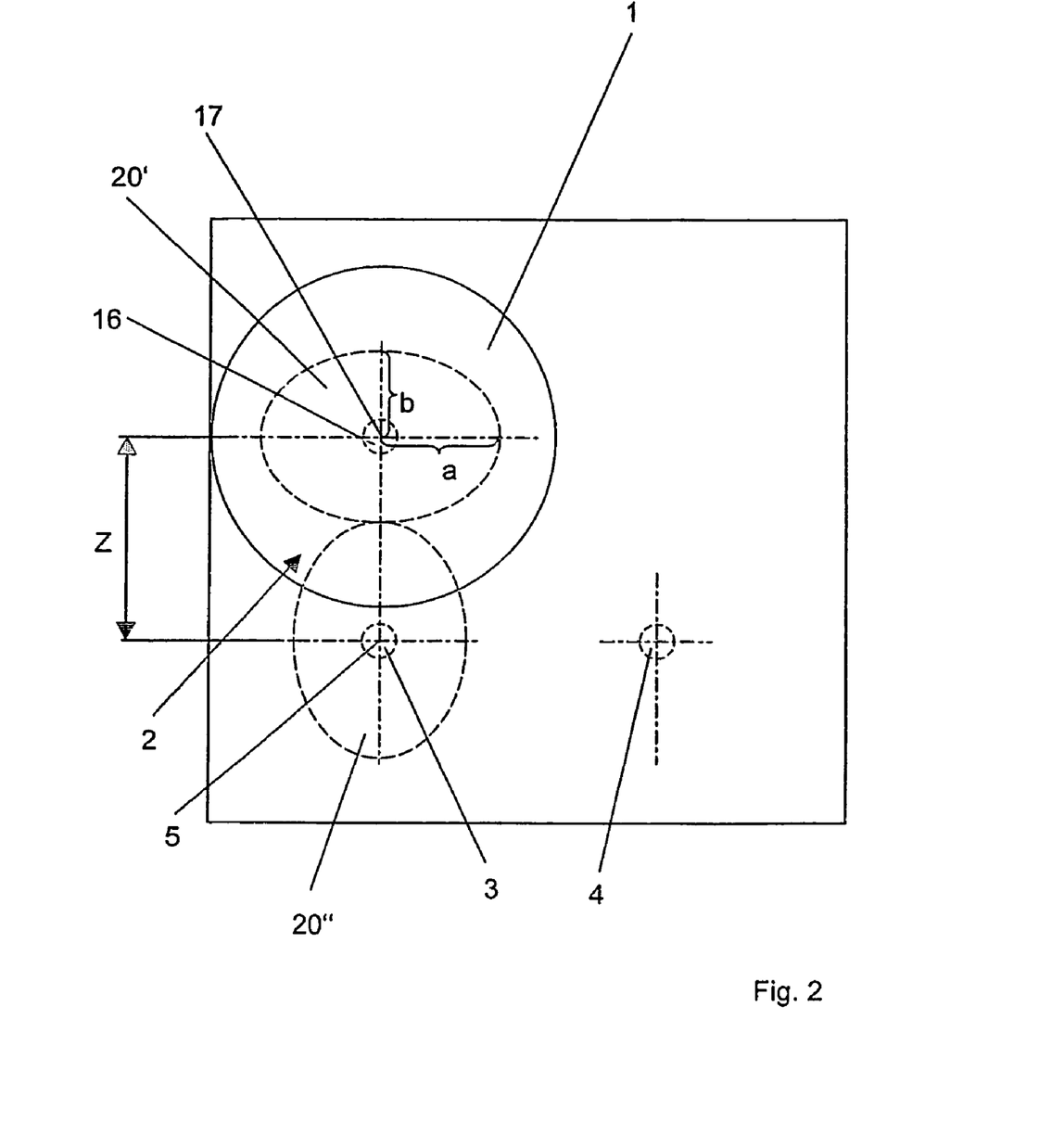
FIG. 2 is a topview of the embodiment of the device shown in FIG. 1.

As shown in FIG. 2, the longitudinal axes 5; 17 of the first shaft 3 and of the drive shaft 16 are a distance Z apart which corresponds to the sum of the small semi-axis b and the large semi-axis a of the two oval gears 20'; 20". Accordingly the two oval gears 20'; 20" shall be mutually engaged at any arbitrary angle of rotation. The two oval gears 20'; 20" in the gear unit 2 make it possible to convert a uniform rotation of the drive shaft 16 into an irregular, rhythmically pulsing rotation of the first shaft 3. By selecting in this instance the ratio of the small semi-axis b to the large semi-axis a of the oval gears 20'; 20" to be 1/√2, the irregular rotation of the first shaft 3 is able to induce the tumbling and rotational motion of the first drive lever 30 of the invertible articulation.

As seen in FIG. 2, only one of the two parallel shafts 3 is connected to the drive shaft 16 of the motorized drive element 1 by the gear unit 2 of oval gears 20', 20".

Figure 3:
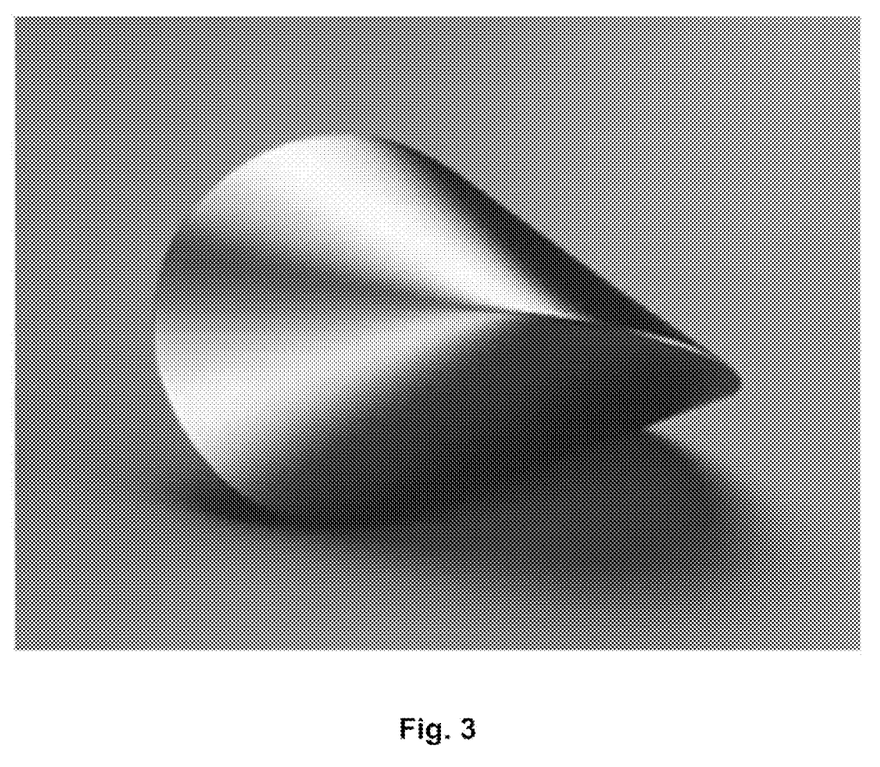
FIG. 3 is a perspective of the drive body of one embodiment mode of the device of the invention.
Figure 4:
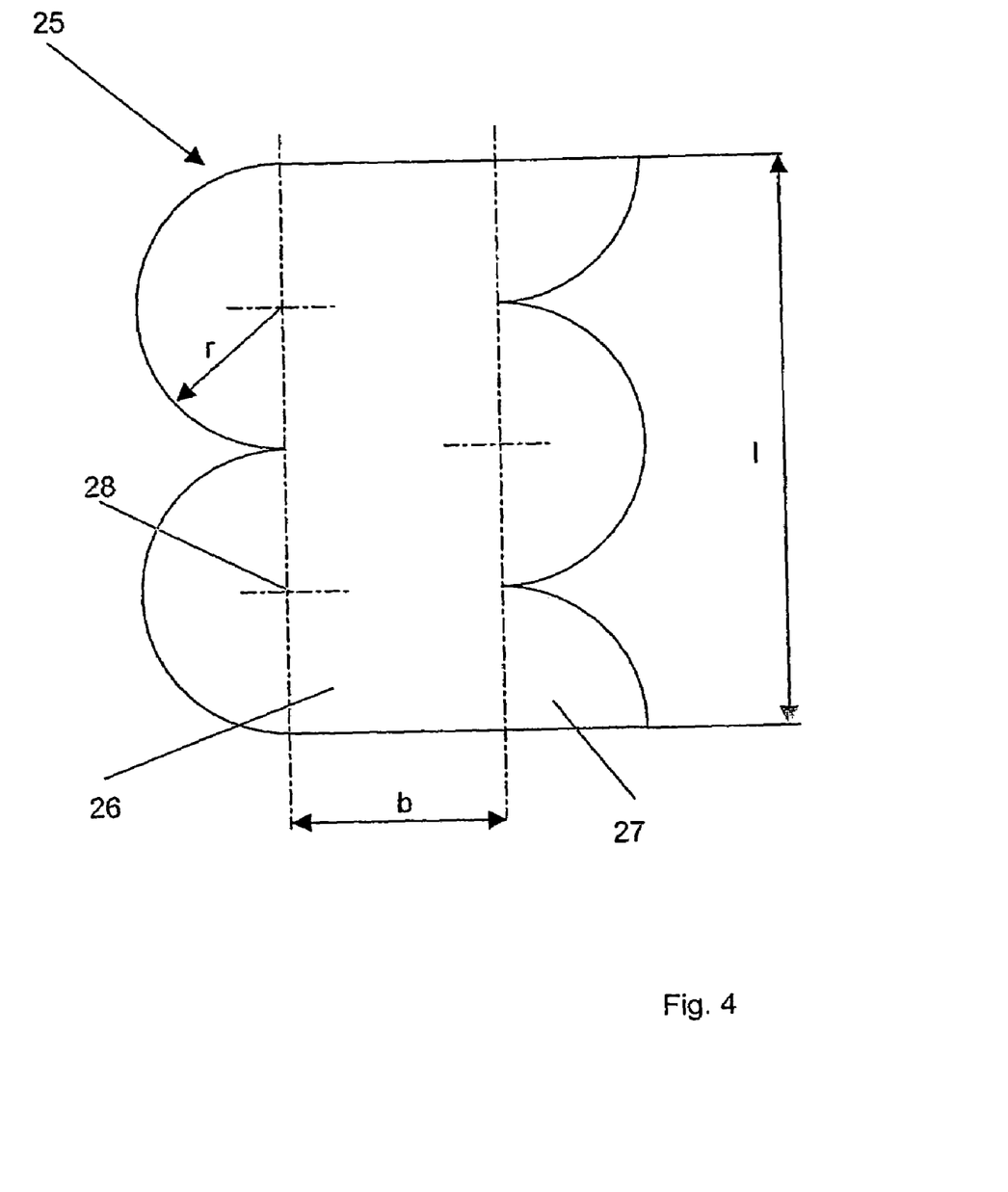
FIG. 4 shows the development of the drive body of FIG. 3.

FIG. 3 is a perspective elevation of the drive body 40 designed as an oloid. FIG. 4 shows the development of this oloid. The developed oloid surface 25 is composed of a rectangular middle element 26 and in each case of four quarter-circle elements 27 configured on the long sides of said rectangular middle element. The length of the middle element 26 is l and its width is b, in this instance the width b corresponding to the distance A (FIG. 1) between the two second axes of rotation 13; 14. The radii r of the quarter-circle elements 27 are one fourth the length l, i.e., r=l/4. Furthermore the centers 28 of the quarter-circle elements 27 are configured in a manner that they are spaced apart by the radius r from the ends of the long sides, whereas, on the other long side of said rectangular middle element 26, two of the centers 28 coincide with the corners between the long and short sides of said element 26 and a further, third center 28 is configured at the half length l of the long side of said rectangular middle element 26.

Figure 5:
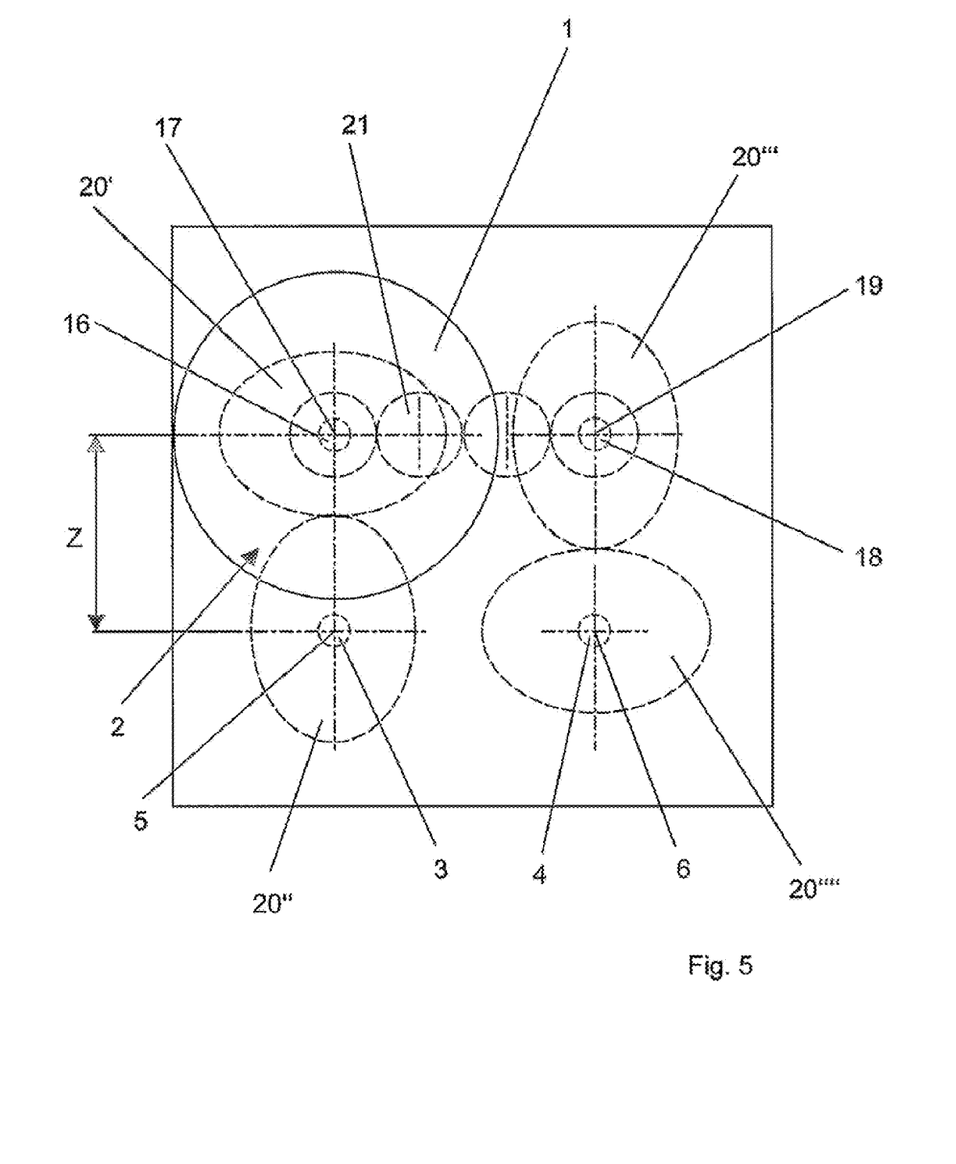
FIG. 5 is a topview of the gear unit of another embodiment mode of the device of the invention.

FIG. 5 shows an embodiment of the gear unit 2 which merely differs from that shown in FIG. 2 in that both shafts 3; 4 are being actuated by means of the unit 2 from the drive shaft 16. For that purpose an intermediate gear unit fitted with four circular gears 21 is mounted between the drive shaft 16 and a further similar shaft 18 parallel to the drive shaft 16. The longitudinal axes 5; 6; 17; 19 of the drive shaft 16, of the second uniformly rotating shaft 18 and of the two irregularly rotating shafts 3; 4 are parallel and are configured at the corners of a rectangle having a height Z. The two oval gears 20'; 20" transmitting torques between the first shaft 3 and the drive shaft 16 are rotated relative to their semi-axes a; b (FIG. 2) by 90°. This feature also applies to the two oval gears 20'''; 20'''' which transmit torques between the second shaft 4 and the second uniformly rotating shaft 18. Both pairs of gears 20'; 20" and 20'''; 20'''' are rotationally 90° apart. The number of circular gears 21 is therefore selected in a way to result in opposite directions of rotation for the drive shaft 16 and the second uniformly rotating shaft 18.

Figure 6:
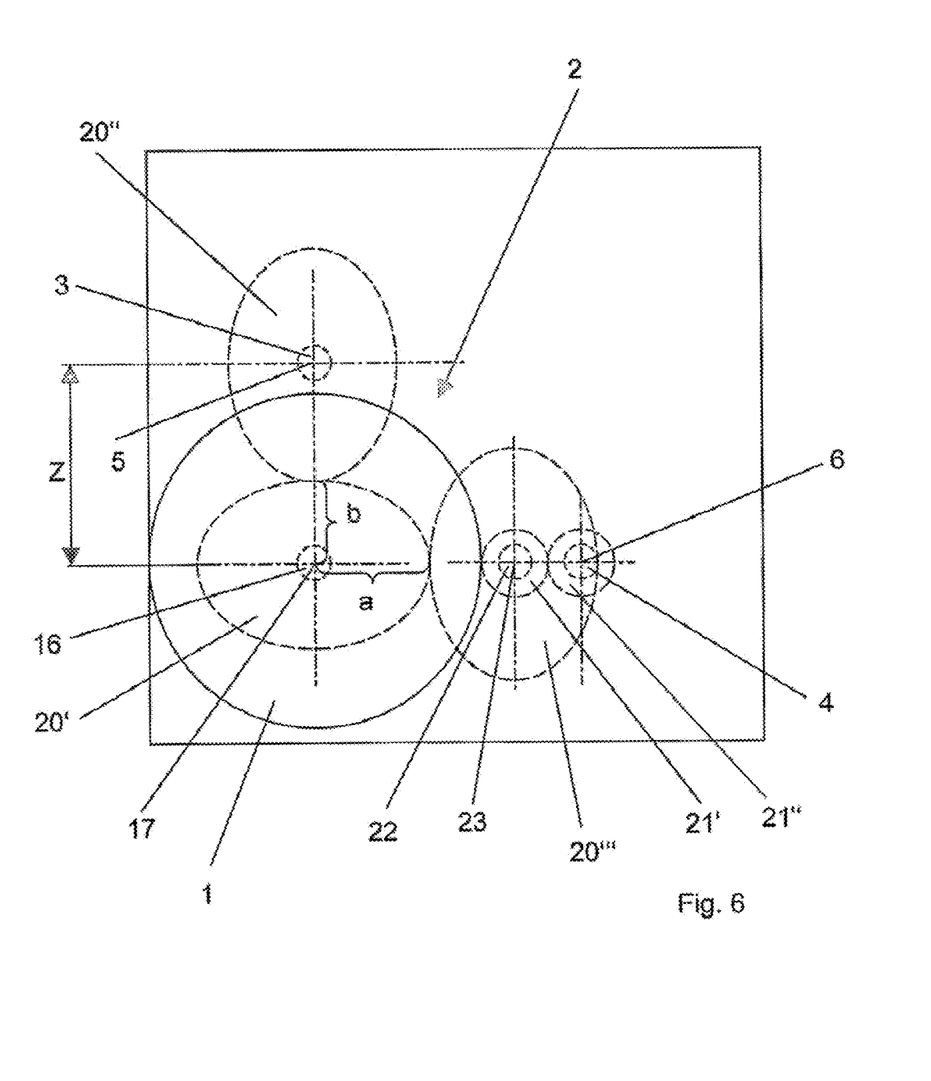
FIG. 6 is a topview of the gear unit of still another embodiment mode of the device of the invention.

FIG. 6 shows another embodiment of the gear unit 2 differing from that of FIG. 2 by the torque transmission from the drive shaft 16 connected to the drive elements 1 to both shafts 3; 4 being implemented by gears 20'; 21'. Furthermore in this instance the oval gears 20'; 20"; 20''' are designed in a manner that the ratio of the small semi-axis b to the large semi-axis a is 1/√2. The torque transmission from the uniformly rotating drive shaft 16 to the irregularly rotating first shaft 3 is implemented by mutually meshing oval gears 20'; 20''' that are shifted by 90° with respect to their semi-axes a; b. Torque transmission from the uniformly rotating drive shaft 16 to the irregularly rotating second shaft 4 is implemented by a pair of oval gears 20'; 20" and a pair of circular gears 21'; 21", the torque transmission taking place from the oval gear 20' connected to the uniformly rotating drive shaft 16, to the oval gear 20''' connected to an irregularly rotating accessory shaft 22, and from there by means of a circular gear 21' which is also connected to the accessory shaft 22 to the circular gear 21" connected to the second shaft 4. The longitudinal axes 5; 6, 17; 23 of the drive shaft 16, of the first and second shafts 5; 6 and of the accessory shaft 22 are parallel, a spacing Z corresponding to the sum of the semi axes a: b of the two oval gears 20'; 20" being subtended between the drive shaft 16 and the first shaft 3. The drive shaft 16 and the accessory shaft 22 also are apart by a distance Z. The circular gears 21'; 21" assure the required direction of rotation of the two shafts 3; 4 and their diameters match the required gap B between the two shafts 3; 4.

Figure 7:
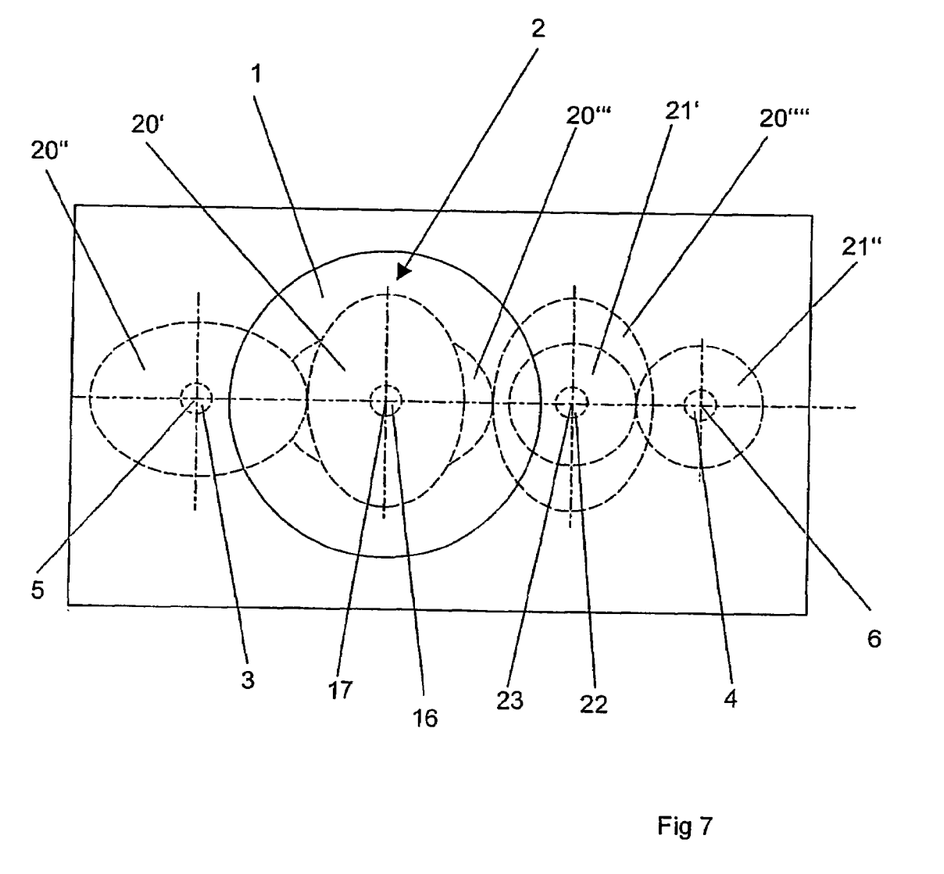
FIG. 7 is a topview of the gear unit of still another embodiment mode of the device of the invention.

FIG. 7 shows an embodiment of the gear unit 2 differing from that of FIG. 2 only in that the torque transmission from the drive shaft 16 to the first shaft 3 is implemented by means of two oval gears 20', 20" and simultaneously there is torque transmission from the drive shaft 16 to the second shaft 4 by means of two oval gears 20'''; 20'''' and two circular gears 21'; 21". The design of both pairs of oval gears 20'; 20"; 20'''; 20'''' is such that the ratio of the small semi-axes b to the large semi-axes a is 1/√2. The two oval gears 20'; 20" connected to the drive shaft 16 are mutually shifted by 90° as regards their semi-axes a; b. Moreover an accessory shaft 22 is mounted between the drive shaft 16 and the second shaft 4, and it is connected to the oval gear 20'''' and the circular gear 21'. The two circular gears 21'; 21" assure that the two shafts 3; 4 rotate in opposite directions. The drive shaft 16, the first and the second shafts 3; 4 and the accessory shaft 22 are configured in a way that their longitudinal axes 5; 6; 17; 23 are mutually parallel.

Figure 8:
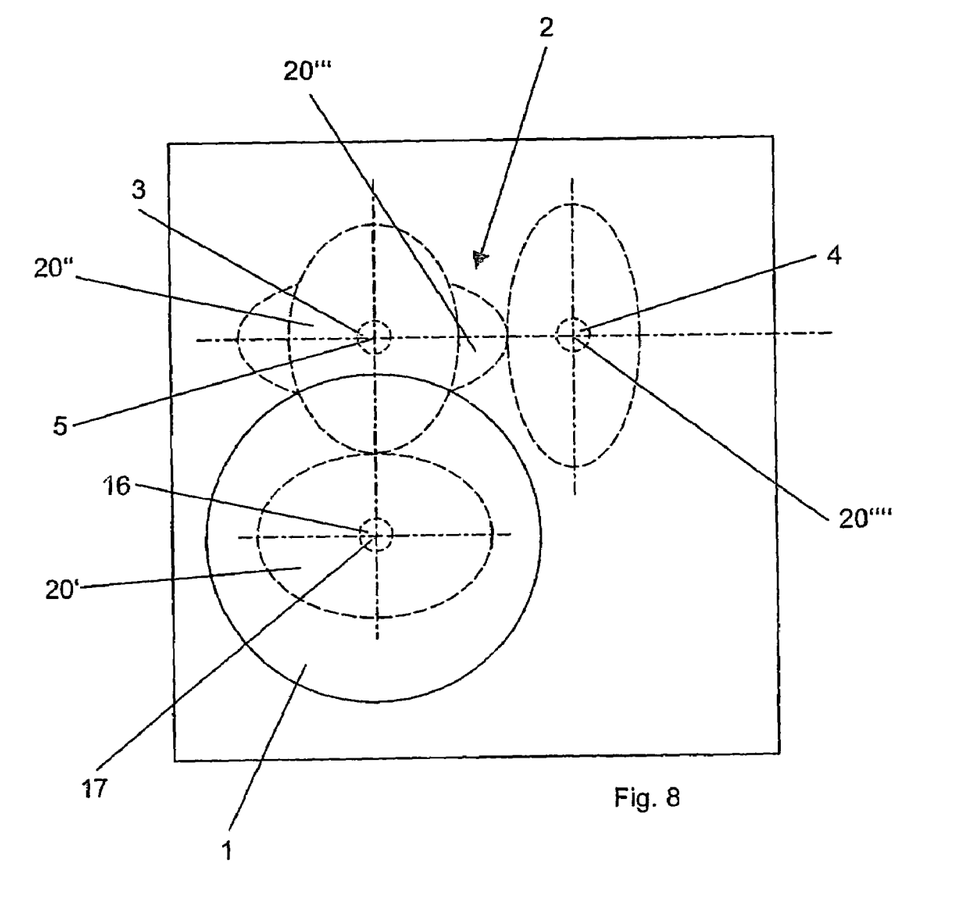
FIG. 8 is a topview of the gear unit of yet another embodiment mode of the device of the invention.

FIG. 8 shows an embodiment of the gear unit 2 differing from that of FIG. 2 only in that torque transmission from the drive shaft 16 to each of the two shafts 3; 4 is implemented by two respective oval gears 20'; 20"; 20'''; 20''''. One oval gear 20' is connected to the drive shaft 16, two oval gears 20"; 20''' are connected to the first shaft 3 and one oval gear 20'''' is connected to the second shaft 4. The two oval gears 20"; 20''' connected to the first shaft 3 are rotation-shifted by 90° as regards their semi-axes. Also, the two oval gears 20', 20" (where 20' is connected to the drive shaft 16 and 20" is connected to the first shaft 3) are configured in a manner that the ratio of the small semi-axes b to the major semi-axes a is $1/\sqrt{2}$ whereas the two oval gears 20'''; 20'''' (where 20''' is connected to the first shaft 3 and 20'''' is connected to the second shaft 4) are configured in a manner that the ratio of the small semi-axes b to the large semi-axes b is 1/2.

The invention claimed is:

1. A device for generating pulsed motions, comprising:
    a motorized drive element (1) connected to a drive shaft (16);
    two parallel shafts (3; 4), each of said parallel shafts having a longitudinal axis (5; 6), a rear end, and a front end (9; 10);
    a gear unit (2) comprising two oval gears (20'; 20") one of said two oval gears (20') being connected to the drive shaft (16) and the other of said two oval gears (20") being connected to the rear end of one of the two parallel shafts (3);
    two arcuate drive levers (30; 31), each of said arcuate drive levers having a first end (32; 33) and at least one second end (34; 35), where each first end (32; 33) of the drive levers (30; 31) is connected in a rotatable manner with one respective front end (9; 10) of the two parallel shafts (3; 4) about a first axis of rotation (11; 12); and
    a polysomic drive body (40) connected to the second ends (34; 35) of the drive levers (30; 31) so as to be rotatable about two second axes of rotation (13; 14);
    wherein the oval gears (20'; 20") exhibit a large semi-axis (a) and a small semi-axis (b),
    a ratio of the small semi-axis (b) to the large semi-axis (a) is $1/\sqrt{2}$, and only one of the two parallel shafts (3) is connected to the drive shaft (16) of said motorized drive element (1) by means of said gear unit (2) of oval gears (20'; 20").

2. The device as claimed in claim 1, wherein each arcuate drive lever (30; 31) subtends a plane (36; 37), the second axes of rotation (13; 14) are situated in the planes (36; 37) and the first axes of rotation (11; 12) are transverse to the planes (36; 37).

3. The device as claimed in claim 1, wherein the second axes of rotation (13; 14) are mutually skewed.

4. The device as claimed in claim 1, wherein the two oval gears (20'; 20") are mutually engaging and roll off one another at a constant axial separation in a positively locking manner.

5. The device as claimed in claim 4, wherein the distance between the axes of the two mutually engaging oval gears (20'; 20") is composed of the sum of the large semi-axis (a) and the small semi-axis (b) of the two oval gears (20'; 20").

\* \* \* \* \*